(No Model.)
J. L. DIBBLE.
GAME APPARATUS.
No. 303,991. Patented Aug. 26, 1884.
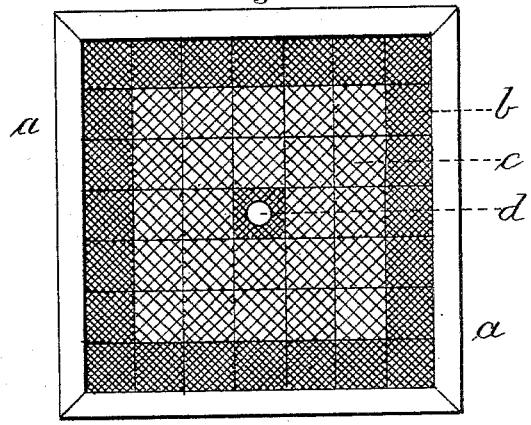
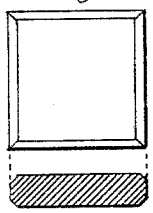
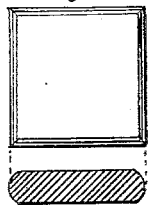
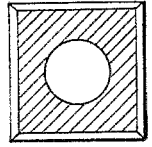
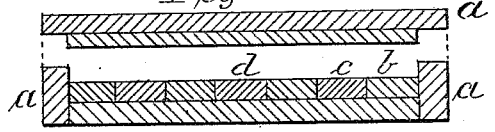
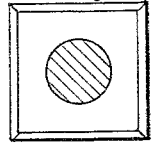
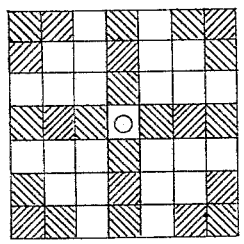
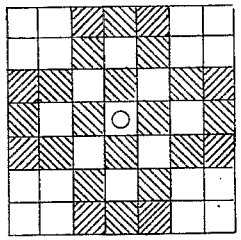
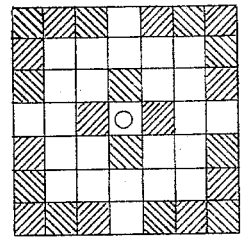
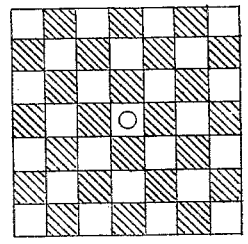
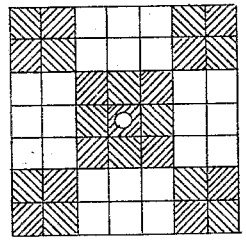
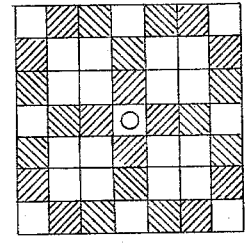
WITNESSES
M. W. Travis
F. A. Baldwin
INVENTOR
Jno. L. Dibble

UNITED STATES PATENT OFFICE.

JOHN L. DIBBLE, OF BROOKLYN, NEW YORK.

GAME APPARATUS.

SPECIFICATION forming part of Letters Patent No. 303,991, dated August 26, 1884.

Application filed June 28, 1884. (No model.)

*To all whom it may concern:*

Be it known that I, JOHN L. DIBBLE, a citizen of the United States, residing at Brooklyn, in the county of Kings and State of New York, have invented a new and entertaining Game Apparatus, of which the following is a specification.

The game consists in the arrangement and rearrangement by the players of colored or marked rectangular pieces within a rectangular inclosure.

Figure 1 shows a plan view of the game apparatus. Fig. 2 shows a section of same. Figs. 3 and 4 show on a larger scale details of movable pieces. Figs. 5 and 6 show the two sides of a distinctively-marked final piece. Figs. 7, 8, 9, 10, 11, and 12 are diagrams showing several of the many possible arrangements of the pieces, to illustrate the uses of the apparatus.

In Fig. 1, $a\,a$ represent a square box-like frame or inclosure, within which are forty-nine square pieces. The superficial area of each piece is approximately one forty-ninth ($\frac{1}{49}$) part of that of the interior of the inclosure. Twenty-four of these pieces are of one color and twenty-four of them are of a different color, it being preferable that the colors of each group be in strong contrast, as black and white or red and blue. In the drawings, Fig. 1, the twenty-four pieces of the darker color are indicated by squares crossed diagonally by closely-spaced lines, one these squares being marked $b$. The twenty-four pieces of the contrasting color are indicated by squares diagonally crossed by lines more widely spaced, one of which is marked $c$. The remaining piece (shown in the center of the figure marked $d$) should bear a mark or marks to readily distinguish it from the others. The nature of the marks or the color of the piece are not material; but I deem it best that one side of the piece be of the same color as the pieces of one of the groups described, and have a spot on it of the contrasting color, and that the other side be of the same color as the other group, and have a spot on it of the contrasting color, as indicated in Figs. 5 and 6, the portions crossed by parallel diagonal lines indicating the darker color, and the portions left white indicating the lighter color.

The box or inclosure and the pieces may be made of wood, paper, or any other suitable material, and may be ornamented as may seem desirable. The depth of the box may be in proportion to the thickness of the pieces in Fig. 2.

$a'$ represents a cover with rabbeted edge, permitting it to bear upon the pieces and hold them fixed when the box is closed. The pieces should be made to fit in the inclosure somewhat loosely, so that, one piece being removed, one or more of the neighboring pieces may be easily slid along, filling the open space and leaving an open space at another part of the inclosure. To facilitate such movements it is desirable to chamfer or round the edges of the pieces, as indicated in Figs. 3 and 4.

Referring to Fig. 1, it will be seen that the darker pieces are arranged on the outer margin of the inclosure, that the lighter pieces are arranged in a central square, and that the marked piece is placed in the center of the group, making a symmetrical arrangement of the pieces in relation to their color, and having the character of a design, and referring to the diagrams, Figs. 7 to 12, inclusive, in which the squares crossed by parallel diagonal lines represent pieces of one color and the squares left white represent pieces of contrasting color, it will be seen that the pieces are arranged in such manner that the colors form symmetrical patterns or designs; and it will be further noticed that different effects are produced solely by changing the arrangement of the pieces. The marked piece $d$ being removed from the inclosure, one of the adjoining pieces may be pushed or slid into its place. A third piece may be then moved into the place vacated by movement of the second, and so continuing, the arrangement of the pieces may be changed from that of one design to another in a greater or less number of movements, according to the skill and care exercised by the party making the movements, and this without removing any of the pieces, except the marked piece, from the inclosure. When a desired arrangement is otherwise complete, the marked piece is put in the open space, finishing the figure. This marked piece I call a "final," its use being to finish the figures, to secure adjoining pieces from lateral displacement when the apparatus is not in use, and by its removal permit the movement of the other pieces.

It will frequently be the case in making the above-described rearrangements that from two to six pieces may be moved simultaneously with a single motion—as, for instance, see Fig. 7. The marked piece or final being removed, thus leaving a space in the center of the inclosure, the mover may place his finger upon the piece on a line with it in the margin, and by a single movement slide it and the two intervening pieces toward the center, thus closing the central space and opening one on the margin of the inclosure. If, in course of the moving, a space should become vacant in either of the corners of the inclosure, the finger may be placed on the piece in the next corner, and it and the five intervening pieces be moved along simultaneously one space, thus closing a space in one corner and opening a space in the next corner by a single movement. It is manifest that if the mover uses the utmost care and skill in thus changing the arrangement of the pieces from that shown in either of the figures to that shown in either of the others a certain number of movements will be absolutely necessary to accomplish the result; and it is further apparent that if the movements are injudiciously made the process may be indefinitely prolonged.

The game consists in two or more players endeavoring to make a given rearrangement of the pieces in the least number of movements. The following I deem the best method of procedure: The players, by choice or chance, decide upon two arrangements of the pieces—as, for instance, those shown in the diagrams, Figs. 7 and 10. The pieces are then to be arranged in accordance with either of the figures. The first player, being decided upon by choice or chance, will remove the final and proceed to rearrange the pieces in the manner described, counting each movement made as one move, whether it be a movement of one or more pieces, until the other figure chosen is completed. A record is then made of the total number of moves made by the player. The second player then proceeds to again rearrange the pieces and endeavors to bring them back to the form they were in at the start, each move of the second player being counted, as in the case of the first, the player making the allotted rearrangement in the least number of moves winning the game. Three or more players may thus engage in the game, the player making a given rearrangement in the fewest moves being the winner.

The apparatus may also be used by a single person as a means of self-entertainment by rearranging the pieces to produce the several figures shown in the drawings, or to plan and work out other figures than those shown, as many more orderly and symmetrical groupings of the pieces may be made. Those shown in Figs. 1 and Figs. 7 to 12, inclusive, I deem sufficient to illustrate the nature and uses of the apparatus. It will also be observed that, as the number of pieces of each color are equal, the colors of a given arrangement may be transposed—that is to say, by making movements as described the dark pieces may be put in the places of the light pieces, and vice versa, thus producing arrangements similar in form but different in appearance, thus in effect doubling the possible number of symmetrical groupings.

Many modifications may be made without departing from the principle of the invention—as, for instance, the inclosure may be made to receive a smaller or larger number of pieces, provided that the size of the pieces be in such proportion to the inclosure that it may contain when full an odd number of pieces, so that there may be space for an equal number of pieces of each color, and also for the final piece $d$. I attach importance to the arrangement with forty-nine pieces, as shown, inasmuch as when the pieces are arranged as in Fig. 1 it will be seen that the twenty-four pieces of one color just suffice to inclose and form a border around the twenty-four pieces of the contrasting color arranged in a square, with the final $d$ in the center. This property of a group of forty-nine pieces will facilitate their arrangement in symmetrical groups. The inclosure may be made oblong instead of square, or more than two colors may be used for the pieces, provided that the groups of each color are of equal number. A pleasing variation may be made by making the pieces of different colors on their opposite sides—as, for instance, twenty-four pieces black upon one side and white on the reverse side, and twenty-four pieces red upon one side and blue upon the reverse side. In this form they may be used with either twenty-four pieces each of two colors upward, or with twelve pieces of each of the four colors named upward. As the final piece $d$ is used only to give a finish to the figures and to prevent the movement of the other pieces when the apparatus is not in use, it may be dispensed with, provided sufficient space is left in the inclosure to permit the movements described, and the game be played and the apparatus used without it.

Other distinguishing-marks for the pieces may be employed; but I consider colors—either those due to the materials used or otherwise produced by usual means—to be the simplest and most effectual.

I claim as my invention and desire to secure by Letters Patent—

1. A game apparatus consisting of a rectangular inclosure inclosing a set of rectangular playing-pieces of contrasting colors adapted to be moved laterally within the inclosure, and to be thus arranged in figures or designs, substantially as and for the purpose described.

2. In a game apparatus, the rectangular inclosure $a\ a$, in combination with and adapted to contain, when filled, a set of rectangular playing-pieces, consisting of an odd number of pieces, two or more groups of which being of contrasting color, and a final piece being of another contrasting color, or bearing distinguishing-marks, the pieces being adapted, on removal of the final piece, to be moved laterally within the inclosure, and to be thus arranged in figures or designs, substantially as and for the purpose described.

3. In combination with the rectangular inclosure $a\ a$, a set of contrastingly-colored rectangular playing-pieces adapted to be moved laterally within the inclosure, and to be thus arranged in figures or designs, the area of each piece being approximately one forty-ninth of that of the interior of the inclosure, as and for the purpose described.

4. In combination with the rectangular inclosure $a\ a$, a set of forty-nine rectangular playing-pieces, consisting of twenty-four pieces of one color, twenty-four pieces of a contrasting color, and a final piece of another contrasting color, or bearing distinguishing-marks, the pieces being adapted, on removal of the final piece, to be moved laterally within the inclosure, and to be thus arranged in figures or designs, substantially as and for the purposes described.

5. In combination with the rectangular inclosure $a\ a$, a set of rectangular playing-pieces consisting of two groups of equal numbers of pieces, the pieces of one group being of one color on one side and a second color on the other side, the pieces of the other group being of a third color on one side, and a fourth color on the other side, and of a final piece bearing distinguishing colors or marks, the whole being arranged substantially as and adapted to be used in the manner herein described.

JNO. L. DIBBLE.

Witnesses:
  M. W. TRAVIS,
  F. A. BALDWIN.